Patented June 9, 1942

2,285,750

UNITED STATES PATENT OFFICE 2,285,750

PROCESS OF PURIFYING WATER

Robert C. Swain, Riverside, Conn., assignor to American Cyanamid Company, New York, N. Y., a corporation of Maine No Drawing. Application July 31, 1940, Serial No. 348,821

5 Claims. (Cl. 210—24)

This invention relates to anion- or cation-active exchange materials intimately associated with an aminotriazine-aldehyde condensation product.

In general, aminotriazine-aldehyde resins such as melamine-formaldehyde resins apparently possess little, if any, ion exchange properties. On the other hand, various other substances possess high ion exchange properties but such substances are often quite soluble and therefore are not suitable for the treatment of large volumes of water containing removable ions.

An object of this invention is to purify water containing small amounts of ion impurities with a substance which has ion exchange properties and which is also highly insoluble in water.

Another object of this invention is to reduce the tendency of ion active materials to dissolve in water.

Still another object of this invention is to reduce the solubility of aldehyde condensation products which are ion exchange active but which are normally highly water soluble and therefore little used commercially.

These and other objects are attained by bringing water into contact with an active ion exchange substance which is intimately associated with an insolubilized aminotriazine-aldehyde condensation product. I have found that surprisingly enough, the association of an aminotriazine-aldehyde condensation product with an ion exchange substance not only reduces the tendency of the ion exchange substance to dissolve in water, but it does not render the ion exchange material inactive.

The following examples in which the proportions are in parts by weight are given by way of illustration and not in limitation.

*Example 1*

|  | Parts |
|---|---|
| Melamine | 126 |
| Guanidine nitrate | 122 |
| Formalin (37% formaldehyde in water) | 324 |

This mixture is adjusted to a pH of about 9–10 with 30.5 parts of soda ash. The solution is refluxed for 1–2 hours and then acidified at 80° C. with 30 parts of concentrated hydrochloric acid (37% HCl in water) diluted with about 25 parts of water. The syrup gels almost immediately to a white, opaque mass. This is ground to pea size, air-dried about 24 hours and then dried overnight at about 60–65° C. It is cured at a slightly higher temperature, e. g., about 100° C. The product formed is again ground and washed with caustic solution. This resin is extremely insoluble and is highly anion-active. It is particularly useful in removing hydrochloric acid from water.

*Example 2*

|  | Parts |
|---|---|
| Melamine | 63 |
| Urea | 30 |
| Guanidine nitrate | 122 |
| Formalin (37% formaldehyde in water) | 284 |

Sufficient alkali, e. g., soda ash, is added to this mixture to adjust it to a pH of 8–10. The solution is refluxed for 1–4 hours and then acidified at about 80° C. with about 55 parts of hydrochloric acid (15–20% HCl in water). The syrup gels almost immediately and the gel is ground and dried at 50–65° C. for 4–24 hours. It is then heated slowly to 100° C. and held at that temperature for about 2 hours. The dried material is again ground and if desired, screened to any predetermined uniform size and washed with dilute caustic solution to remove any excess acid as well as any soluble salts which may be present. The resulting resin is about as insoluble and it has about the same anion active exchange capacity as that produced according to Example 1.

While melamine-formaldehyde resins are generally preferred as the insolubilizing material, other aminotriazine-aldehyde resins may be used. Among these are resins produced by condensing an aldehyde, e. g., formaldehyde, acetaldehyde, propionaldehyde, butyraldehyde, cinnamyl aldehyde, furfural, etc., with one or more of the aminotriazines, e. g., melamine and its derivatives such as 2,4,6-triethyl- and triphenyl-triamino-1,3,5-triazines, 2,4,6 - trihydrazino-1,3,5-triazine, as well as triazines containing one or two amino groups such as the guanamines, e. g., formoguanamine, lauroguanamine, 2 - amino-1,3,5-triazine and their substitution products. Obviously commercial mixtures of the various aminotriazines or mixtures thereof with other amino compounds may be used if desired. One example of such commercial mixtures is the product obtained by heating dicyandiamide sufficiently to obtain a significant amount of melamine together with other reactive amino bodies. Furthermore, other amino materials may be used in admixture with the aminotriazines, e. g., urea, thiourea, dicyandiamide, etc. In some instances, it is also desirable to react other substances with formaldehyde in conjunction with an amino-triazine or mixtures of aminotriazines and other amino bodies, e. g., phenol, aniline, phenylene diamine, quinoline, etc.

Condensation products may be produced by any suitable process and with any desired combining ratio of aldehyde to aminotriazine or other reactive materials, from 1:1 up to 5:1 or even higher. Products wherein the ratio of aminotriazine to formaldehyde is between about 1:2 and 1:4 are preferred.

Aminotriazine resins containing other substances such as urea, suitable for use according to this invention are those containing a substantial proportion of aminotriazine, e. g., at least about 20% of the total material capable of reacting with formaldehyde in order to obtain materials having superior water resistance and low solubility.

Sufficient ion active exchange materials should be included to provide the resin with a substantial ion active capacity. For this purpose the amount required varies widely with the solubility of the particular ion active material used, the activity of the ion active material used, the concentration of the ionic impurities in the water to be treated, etc. In general, about 25% to about 75% of the ion active material based upon the total weight including the aminotriazine-aldehyde condensation product is satisfactory.

The active materials which may be insolubilized with an aminotriazine-aldehyde condensation product include the anion active materials, e. g., guanidine-aldehyde condensation products (obtainable by the use of guanidine salts such as the nitrate, carbonate, etc. as indicated in the above examples), biguanide-aldehyde condensation products, substituted biguanide, such as phenyl biguanide-aldehyde condensation products, guanyl urea-aldehyde condensation products, m-phenylene diamine-aldehyde condensation products, m-ethylaminobenzene-aldehyde condensation products, 5-alkyl-m-phenylene diamine-aldehyde condensation products, aniline-aldehyde condensation products, m-toluidine-aldehyde condensation products, sym-m-xylidine-aldehyde condensation products, alkali treated asphaltic material, etc., as well as the cation active exchange materials, e. g., p-phenol sulfonic acid-formaldehyde resins, tannin-formaldehyde resins, 1-hydroxybenzene-4-sulfonic acid-formaldehyde condensation products, naphthalene sulfonic acid-formaldehyde condensation products, 1,3-dihydroxybenzene-sulfonic acid-formaldehyde condensation products, 1,2-dihydroxybenzene-sulfonic acid-formaldehyde condensation products, phenanthrene-sulfonic acid-formaldehyde condensation products, acenaphthene-sulfonic acid-formaldehyde condensation products, ammeline-aldehyde condensation products, ammelide-aldehyde condensation products, cyanuric acid-formaldehyde condensation products, sulfated asphaltic material, etc. The various aldehyde condensation products are preferably formaldehyde condensation products. Obviously polymers of formaldehyde or substances which yield formaldehyde may be used in place of formaldehyde itself. Furthermore, other active materials may be included with aminotriazine-aldehyde condensation products, e. g., zeolites, activated charcoal, activated clays, etc.

Acid or base exchange compositions produced according to my invention are regenerated in the usual way by treatment with dilute solutions of salts, bases or acids. It has been found that the exchange capacity and the regeneration of the active materials are not generally impaired by the presence of the aminotriazine-aldehyde resin.

Products made in accordance with my invention are useful for a wide variety of purposes, depending primarily upon the ion active material employed. Some of the uses which may be mentioned by way of example are: water softening, acid removal, purification of sugar juices, purifying water from lead pipes, bicarbonate removal, removal of various metal ions, etc. Another important use of my products is in the removal and recovery of valuable cations or anions, e. g., phosphate anions. Still another application of my active materials is in decolorizing solutions containing colored material and also solutions containing organic impurities. Some of my products also find application in adsorption processes for ammonia, triethylamine, carbon dioxide, sulphur dioxide, hydrogen chloride, hydrogen sulphide, ethylene, etc. One of the advantages of the use of resinous water purification media such as those described herein is that it is possible to obtain a neutral water, whereas with many of the known water softeners this is not possible.

Obviously many modifications and variations in the processes and compositions described above may be made without departing from the spirit and scope of the invention as defined in the appended claims.

I claim:

1. A process which comprises contacting water containing ionic impurities with an active ion exchange material, said exchange material including a reversibly reactive ion exchange component which has substantial water solubility but which is chemically bound with an insolubilized by an aminotriazine-aldehyde condensation product.

2. A process which comprises contacting water containing ionic impurities with an active ion exchange material, said exchange material including a reversibly reactive anion exchange component which has substantial water solubility but which is chemically bound with and insolubilized by an aminotriazine-aldehyde condensation product.

3. A process which comprises contacting water containing ionic impurities with an active ion exchange material, said exchange material including a reversibly reactive cation exchange component which has substantial water solubility but which is chemically bound with and insolubilized by an aminotriazine-aldehyde condensation product.

4. A process of purifying water containing ionic impurities which comprises bringing the water into contact with an active anion exchange substance comprising guanidine-formaldehyde condensation products, said substance being intimately associated and chemically bound with an insolubilized aminotriazine-aldehyde condensation product, whereby the active anion exchange substance is rendered incapable of dissolving in the water in a substantial amount and yet retains its active ion exchange properties.

5. A process of purifying water containing ionic impurities which comprises bringing the water into contact with an anion exchange substance, comprising guanidine-formaldehyde condensation product, said substance being intimately associated and chemically bound with an insolubilized melamine-formaldehyde condensation product, whereby the active substance is rendered incapable of dissolving in the water in a substantial amount and yet retains its active ion exchange properties.

ROBERT C. SWAIN.